A. SLIPCEVIC.
NON-SKID DEVICE.
APPLICATION FILED APR. 3, 1914.
1,105,931.
Patented Aug. 4, 1914.
2 SHEETS—SHEET 1.
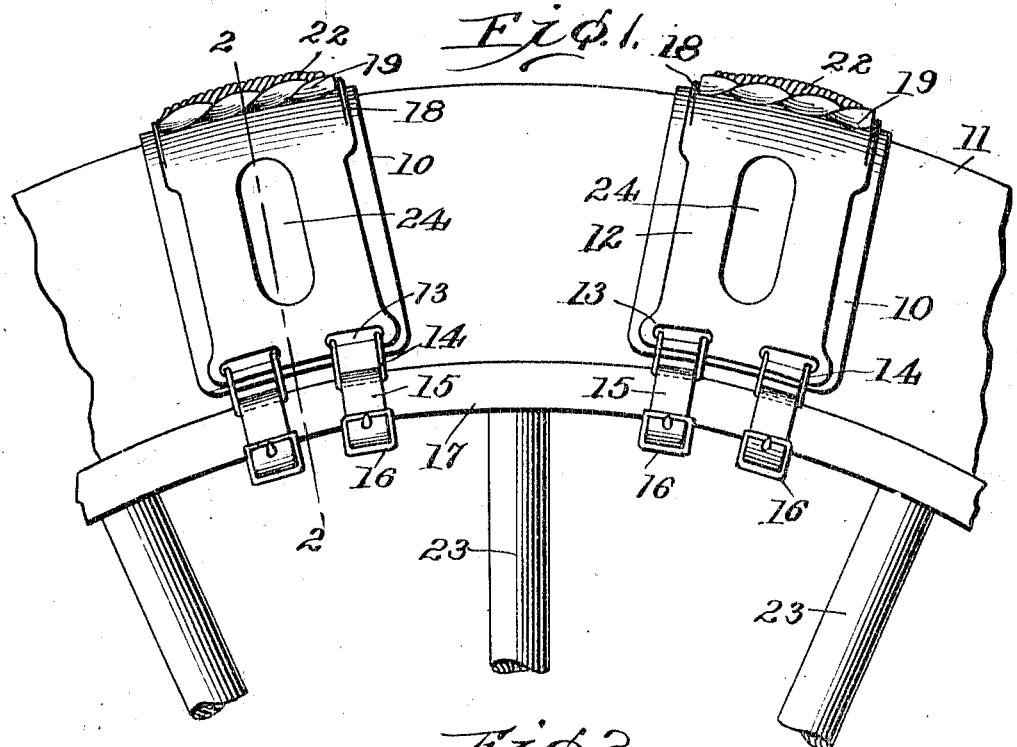
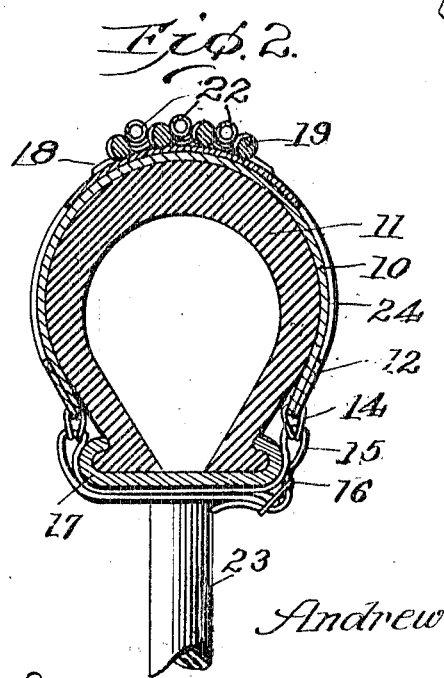
Witnesses
J. M. Fowler Jr.
H. B. Takács
Inventor
Andrew Slipcevic
By A. M. Wilson
Attorney A. SLIPCEVIC.
NON-SKID DEVICE.
APPLICATION FILED APR. 3, 1914.
1,105,931.
Patented Aug. 4, 1914.
2 SHEETS—SHEET 2.
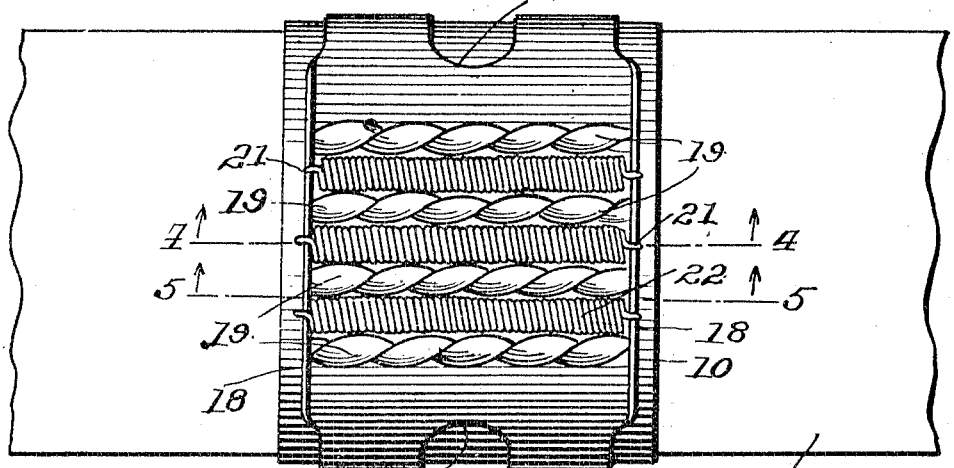
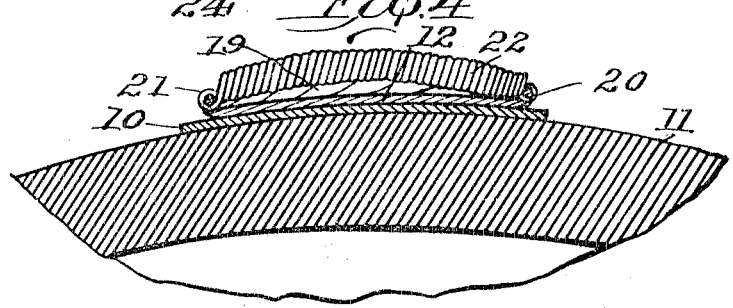
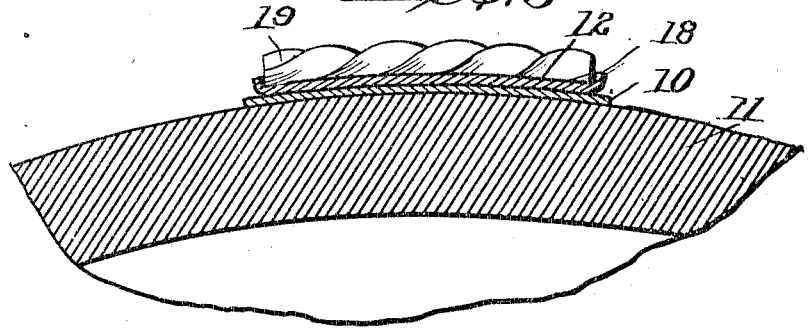
Inventor
Andrew Slipcevic
Witnesses
J. M. Fowler Jr.
H. B. Takács
By A. M. Wilson
Attorney

UNITED STATES PATENT OFFICE.

ANDREW SLIPCEVIC, OF ERIE, PENNSYLVANIA.

NON-SKID DEVICE.

1,105,931.  Specification of Letters Patent.  Patented Aug. 4, 1914.

Application filed April 3, 1914. Serial No. 829,232.

*To all whom it may concern:*

Be it known that I, ANDREW SLIPCEVIC, a citizen of the United States, and residing at Erie, in the county of Erie and State of Pennsylvania, have invented certain new and useful Improvements in Non-Skid Devices, of which the following is a specification.

This invention relates to certain new and useful improvements in non-skid devices.

The primary object of this invention is to provide a non-skid element that is easy and inexpensive to manufacture and one that may be quickly applied to a vehicle wheel and being efficient in preventing side slipping and skidding as well as increasing the ground traction qualities of the wheel.

A further object is to provide a non-skid plate having a tread surface positioning spiral bars and coil springs each lying longitudinally of the tread and alternating with one another, the spring members being replaceable.

A still further object is to provide a non-skid element adapted to be secured in any desired numbers and distances apart to the tread portion of a wheel, each provided with a metallic gripping tread and positionable upon the wheel encircling the tire and felly thereof.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like designating characters refer to corresponding parts throughout the several views:—Figure 1 is a side elevation of a portion of a wheel provided with two of the present devices. Fig. 2 is a transverse sectional view of Fig. 1 taken upon line 2—2 of Fig. 1. Fig. 3 is an enlarged plan view of a section of the tire and the device thereon. Fig. 4 is a detail sectional view taken upon line 4—4 of Fig. 3 in the direction indicated by the arrows, the spring however, being in side elevation, and, Fig. 5 is a similar sectional view taken upon line 5—5, of Fig. 3 as indicated by the arrows.

Referring more in detail to the drawings, it is designed to provide a pad of heavy leather or similar material 10 positionable upon the tire as 11 and having a metallic plate 12 of slightly less dimensions and seated upon the outer surface of the pad and encircling the tire, both of said plate and pad being provided with slots 13 at their opposite ends, in which are positioned links 14 for the reception of straps 15 which are secured therebetween and provided with buckles 16 to be clasped adjacent the lower side of the rim or felly 17 of the wheel for locking the combined plate and pad upon the tire. The opposite edges of the plate are upturned in the form of opposite parallel marginal flanges 18 while spiral metal bars 19 are flatly secured between said flanges upon the plate and positioned longitudinally of the tread portion thereof for positioning longitudinally of the tire when the device is in position thereon. Said flanges are provided with opposite perforations 20 for receiving the hooked ends 21 of closely coiled helical springs 22 whereby said springs are secured, bowed slightly outwardly, between each two adjacent ones of the bars 19 and lying parallel to said bars, these springs being likewise positioned longitudinally of the tread portion of the plate and tire.

The complete operation of the device will be apparent from the above detailed description in that the devices being furnished in any desired numbers, the same upon removing the straps 15 are readily applied around the tire and the strips then employed for securing the device in place thereon and with the longitudinal tread members consisting of the spiral bars and intermediately positioned coils. Such devices being attached to the tire and preferably positioned between the wheel spokes 23 as shown in Fig. 1, the tread of the tire is provided at intervals with the ground traction surfaces, while the springs 22 may be readily removed and replaced when desired by unbending the hooked ends 21 thereof while such springs may be entirely eliminated if desired, it being also noted that the plates 12 are provided with cut-out portions or openings 24 upon the opposite sides thereof which reduces their weight.

While the forms of the invention herein shown and described are what are believed to be preferable embodiments thereof, it is nevertheless to be understood that various forms and modifications may be had without departing from the spirit and scope of the invention as claimed.

What is claimed as new is:—

1. A device of the class described, comprising a flexible pad adapted to encircle a tire and having slots adjacent its opposite ends, a metallic plate seating upon said pad and having slots adjacent its ends registering with the slots in the pad, links positioned through said slots of the pad and plate, straps extending through said links and secured around the felly of the wheel, upturned opposite parallel flanges upon said plate having perforations therethrough, outwardly bowed helical springs secured in said perforations and positioned in parallelism between said flanges, and spiral metallic bars secured between said flanges alternating with said springs and flatly engaging upon said plate.

2. A device of the class described, comprising a leather pad adapted to encircle a tire, a metallic plate flatly positioned upon the outer surface of said pad, said pad and plate provided with alining slots through their opposite ends, links engaging within said slots, straps positioned through said links and secured around said felly, outwardly projecting marginal flanges upon said plate and positioned at the tread portion thereof, spiral metallic bars secured in flat engagement upon said plate between said flanges and positioned parallel to each other and longitudinal of the tread portion of the plate, said flanges provided with opposite alining perforations, and closely coiled removable helical springs outwardly bowed and having their ends in hooked engagement through said perforations and positioned in alternation with said bars.

In testimony whereof I affix my signature in presence of two witnesses.

ANDREW SLIPCEVIC.

Witnesses:
  HENRY VAJDA,
  JOSEF BAUER.